US011915622B2

(12) United States Patent
Dominiack

(10) Patent No.: US 11,915,622 B2
(45) Date of Patent: Feb. 27, 2024

(54) TEMPORARY TOILET SIGNAGE

(71) Applicant: Dennis Eugene Dominiack, Sioux Falls, SD (US)

(72) Inventor: Dennis Eugene Dominiack, Sioux Falls, SD (US)

( * ) Notice: Subject to any disclaimer, the term of this patent is extended or adjusted under 35 U.S.C. 154(b) by 0 days.

(21) Appl. No.: 18/347,100

(22) Filed: Jul. 5, 2023

(65) Prior Publication Data

US 2023/0410695 A1 Dec. 21, 2023

Related U.S. Application Data

(63) Continuation of application No. 17/977,154, filed on Oct. 31, 2022, now abandoned.

(60) Provisional application No. 63/304,096, filed on Jan. 28, 2022.

(51) Int. Cl.

*G09F 7/20* (2006.01)
*G09F 23/00* (2006.01)
*G09F 7/18* (2006.01)

(52) U.S. Cl.

CPC ................ *G09F 7/20* (2013.01); *G09F 23/00* (2013.01); *G09F 2007/186* (2013.01); *G09F 2007/1852* (2013.01); *G09F 2007/1873* (2013.01)

(58) Field of Classification Search

CPC .... G09F 7/20; G09F 23/00; G09F 2007/1852; G09F 2007/186; G09F 2007/1873

See application file for complete search history.

(56) References Cited

U.S. PATENT DOCUMENTS

| | | | | | |
|---|---|---|---|---|---|
| 715,884 | A * | 12/1902 | Shuck | G09F 17/00 | 40/604 |
| 3,678,886 | A * | 7/1972 | Tibbet | G09F 17/00 | 248/230.8 |
| 3,691,677 | A * | 9/1972 | Blaising | G09F 7/20 | 40/606.15 |
| 3,785,337 | A * | 1/1974 | Flowerday | E01F 9/619 | 40/302 |
| 4,105,190 | A * | 8/1978 | Curtis | E01F 13/028 | 116/63 P |
| 4,761,904 | A * | 8/1988 | Fast | G09F 3/18 | 40/661.09 |
| 4,813,369 | A * | 3/1989 | Moreland | G08B 5/00 | 24/442 |
| 4,893,668 | A * | 1/1990 | Nomura | B60J 1/2011 | 160/354 |
| 5,092,066 | A * | 3/1992 | Brewster | G09F 7/18 | 40/607.13 |
| 5,533,287 | A * | 7/1996 | Cole | B60Q 1/50 | 40/604 |

(Continued)

*Primary Examiner* — Gary C Hoge

(74) *Attorney, Agent, or Firm* — Fredrikson & Byron, P.A.

(57) ABSTRACT

In general, the disclosure is directed to a temporary maintenance sign for a toilet including a first adherence mechanism and a second adherence mechanism, such as a suction cup or a locking suction cup that includes a pressure lever. The temporary maintenance sign further includes a flexible body that connects to the first adherence mechanism on a first end of the flexible body and connects to the second adherence mechanism on a second end of the flexible body. The flexible body may be made out of a semi-rigid metal, a semi-rigid plastic, a semi-rigid fiberglass, a semi-rigid rubber, a flexible metal, a flexible plastic, a flexible fiberglass, or a flexible rubber, among other things.

18 Claims, 5 Drawing Sheets

(56) References Cited

U.S. PATENT DOCUMENTS

| | | | | |
|---|---|---|---|---|
| 5,848,488 | A * | 12/1998 | Norwood | G09F 7/18<br>40/673 |
| D407,346 | S * | 3/1999 | Wyatt | D11/183 |
| 6,782,653 | B1 * | 8/2004 | Thomas | A01M 31/06<br>43/2 |
| 7,779,566 | B2 * | 8/2010 | Kassouni | G09F 3/205<br>40/308 |
| 7,845,609 | B2 * | 12/2010 | Bernard | G09F 7/18<br>248/342 |
| 11,073,744 | B1 * | 7/2021 | Wilson | G03B 15/06 |
| 2008/0134554 | A1 * | 6/2008 | Pitcher | G09F 7/20<br>248/323 |
| 2013/0291415 | A1 * | 11/2013 | Stein | G09F 15/0018<br>40/601 |
| 2016/0275829 | A1 * | 9/2016 | White | G09F 15/025 |
| 2019/0343087 | A1 * | 11/2019 | White | A01K 27/005 |
| 2020/0043390 | A1 * | 2/2020 | Bader | G09F 17/00 |
| 2021/0074186 | A1 * | 3/2021 | Weis | G09F 7/205 |

* cited by examiner

TEMPORARY TOILET SIGNAGE

PRIORITY CLAIM

This application is a continuation of U.S. patent application Ser. No. 17/977,154, filed Oct. 31, 2022, which claims the benefit of U.S. Provisional Application No. 63/304,096, filed Jan. 28, 2022, with the entire content of each being incorporated herein.

TECHNICAL FIELD

The disclosure relates to mechanical maintenance signage.

BACKGROUND

When a toilet is clogged, plugged, or otherwise out of order, a maintenance person must provide some type of indication that the toilet is not in proper working condition or risk patrons continuing to use the toilet. Currently, the indication is generally wasteful, cumbersome, or both. Indications include placing plastic garbage bags over the toilet, creating a hand-written sign, or using some sort of caution tape, each of which must be disposed after being installed.

SUMMARY

In general, the disclosure is directed to a temporary maintenance sign for a toilet including a first adherence mechanism and a second adherence mechanism, such as a suction cup or a locking suction cup that includes a pressure lever. The temporary maintenance sign further includes a flexible body that connects to the first adherence mechanism on a first end of the flexible body and connects to the second adherence mechanism on a second end of the flexible body. The flexible body may be made out of a semi-rigid metal, a semi-rigid plastic, a semi-rigid fiberglass, a semi-rigid rubber, a flexible metal, a flexible plastic, a flexible fiberglass, or a flexible rubber, among other things.

When installed, the first adherence mechanism may adhere to a first surface of a toilet, and the second adherence mechanism may adhere to a second surface of the toilet. When both adherence mechanisms are adhered to the respective surfaces of the toilet, the flexible body may pass over or in front of an opening of the toilet. In some instances, the flexible body may include mechanisms to receive an out-of-order sign, bringing additional awareness to users that the toilet is not in proper condition for use.

The temporary maintenance sign produces a number of benefits over the disposable and cumbersome temporary signs described above. By using the adherence mechanisms described herein, the temporary maintenance sign is easy to install on the smooth, hard surfaces provided by the glazed ceramic, metal, plastic, vitreous china, or porcelain toilets. The temporary maintenance sign is also reusable, reducing costs and reducing waste. Additionally, by protruding over an opening of the toilet, the temporary maintenance sign provides an adequate physical barrier to dissuade patrons from utilizing the toilets to which the temporary maintenance signs are attached.

In another example, the disclosure is directed to a method for installing the temporary maintenance sign, the method including adhering the first adherence mechanism to a first surface of the toilet and adhering the second adherence mechanism to a second surface of the toilet, wherein, when the first adherence mechanism is adhered to the first surface of the toilet and when the second adherence mechanism is adhered to the second surface of the toilet, the flexible body spans across an opening in the toilet.

In another example, the disclosure is directed to a system including a toilet and the temporary maintenance sign.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
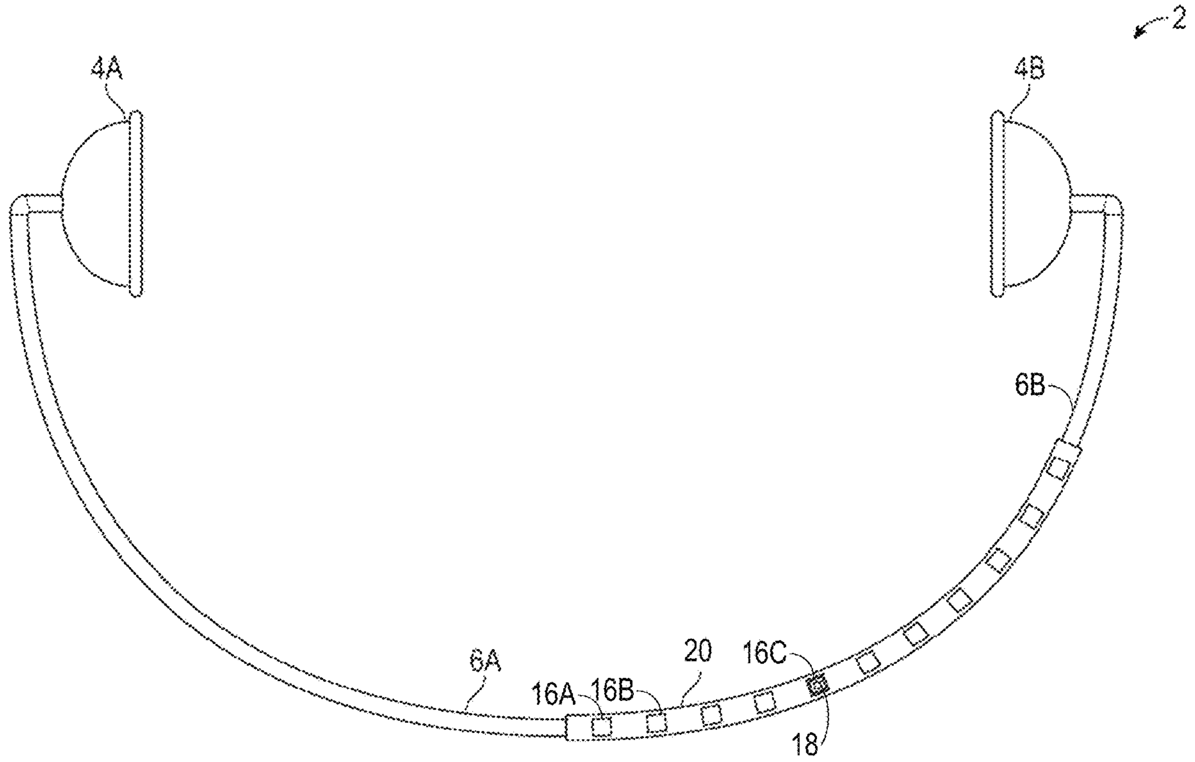
FIG. 1 is a conceptual diagram illustrating a temporary maintenance sign in accordance with this disclosure.

FIG. 1 is a conceptual diagram illustrating temporary maintenance sign 2 in accordance with this disclosure. Temporary maintenance sign 2 includes first adherence mechanism 4A and second adherence mechanism 4B. Temporary maintenance sign 2 further includes flexible body segments 6A and 6B (collectively, "flexible body 6") that connects to first adherence mechanism 4A on a first end of flexible body 6 and connects to second adherence mechanism 4B on a second end of flexible body 6.

In the example of FIG. 1, first adherence mechanism 4A and second adherence mechanism 4B may each be a suction cup, or may also be a locking suction cup with a pressure lever. In this way, adherence mechanisms 4A and 4B may be specifically crafted for adhering to smooth, hard surfaces, such as the surfaces that make up the sides of a toilet.

Flexible body 6 may be made of any number of suitable materials. These materials could include any one or more of a semi-rigid metal, a semi-rigid plastic, a semi-rigid fiberglass, a semi-rigid rubber, a flexible metal, a flexible plastic, a flexible fiberglass, and a flexible rubber, among other materials. Given the area of installation, flexible body 6 may ultimately be any material that is rigid enough to extend across an opening in a toilet to form a physical and visual barrier between the toilet and the area where a user would typically be present if they were to use the toilet.

Given this described configuration of flexible body 6, adherence mechanisms 4A and 4B may use alternate forces other than suction to temporarily adhere to a toilet. For instance, adherence mechanisms 4A and 4B may be flat or textured rubber, silicone, plastic, fiberglass, or any other material that can create friction against ceramic, plastic, or metal toilets. For instance, flexible body 6, after being bent for installation, may create elastic forces on adherence mechanisms 4A and 4B pushing inward as flexible body 6 is straightened to go around the toilet. With these elastic forces, adherence mechanisms 4A and 4B may not require a force as strong as suction to successfully install temporary maintenance sign 2. Rather, adherence mechanisms 4A and 4B may only need to be a flat or textured material that, when the elastic forces are applied to adherence mechanisms 4A and 4B, create enough friction that temporary maintenance sign is held in place. In addition to the materials described above, adherence mechanisms 4A and 4B may be of certain shapes, such as circular, square, X-shaped, cross-shaped, triangular, rectangular, pentagonal, or any other shape, and of an adequate size to create the appropriate steadying forces.

Figure 3:
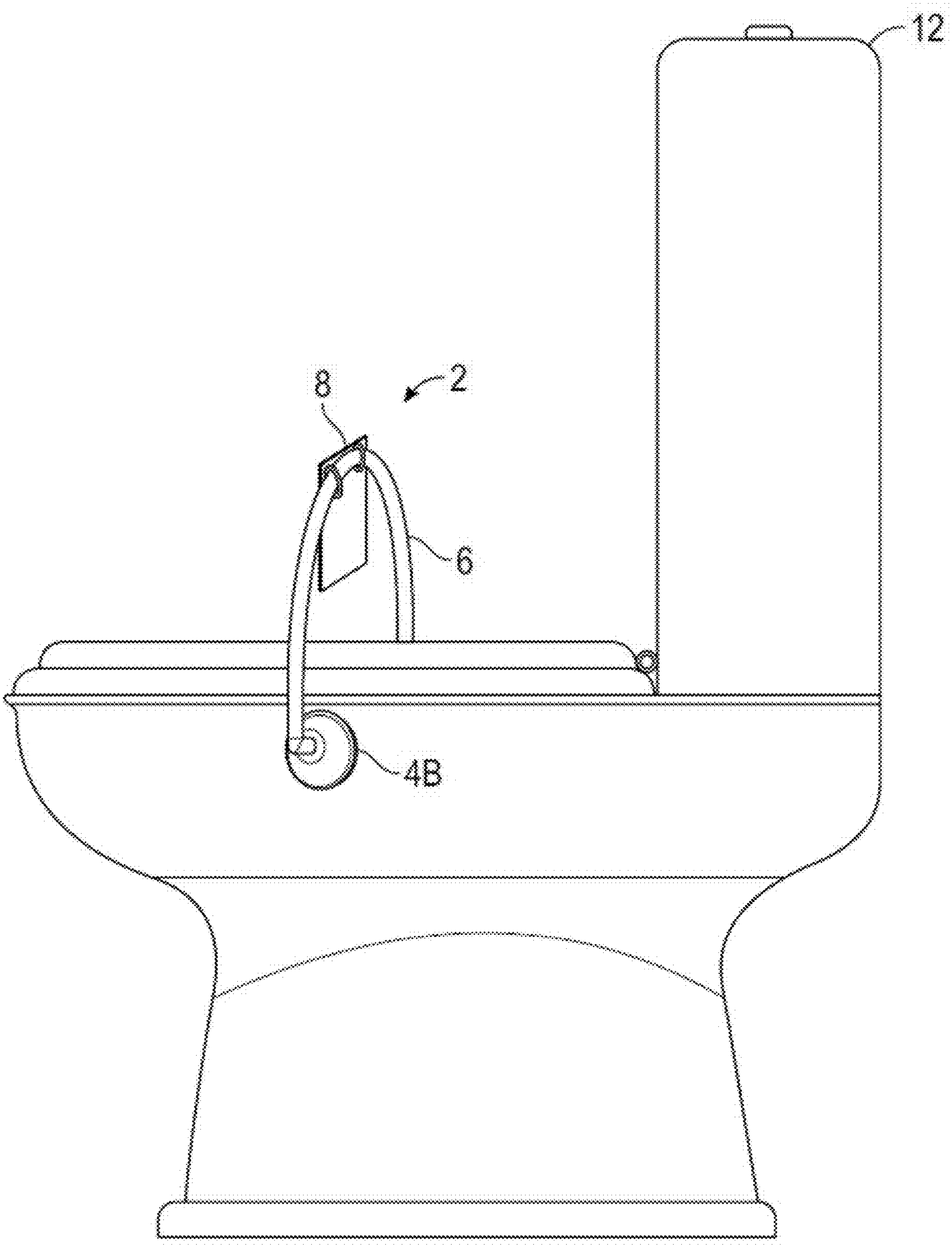
FIG. 3 is a conceptual diagram illustrating a side view of an example of the temporary maintenance sign holding an out-of-order sign and installed on a bowl-type toilet, in accordance with this disclosure.

Flexible body 6 may have many configurations. For instance, as shown in FIG. 3, flexible body 6 may be a single, continuous piece connecting the first adherence mechanism and the second adherence mechanism.

Figure 2:
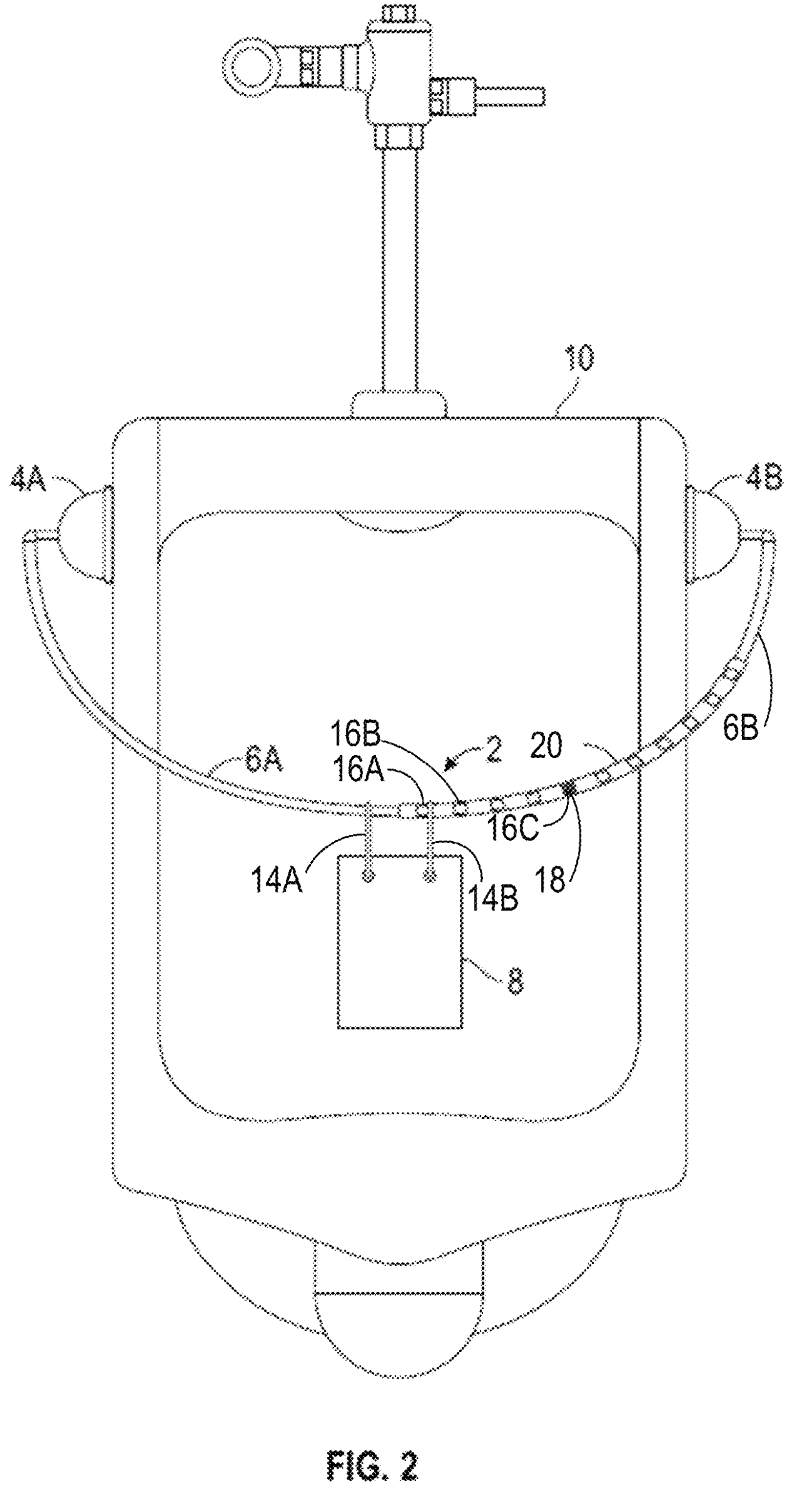
FIG. 2 is a conceptual diagram illustrating a front view of an example of the temporary maintenance sign holding an out-of-order sign and installed on a urinal-type toilet, in accordance with this disclosure.

In other instances, such as the instances of FIGS. 1 and 2, flexible body 6 may include a first portion 6A that includes the first end and a second portion 6B that includes the second end. First portion 6A may be physically separate from second portion 6B of the flexible body, meaning that they may be two distinct pieces that are not manufactured to be a constant, continuous piece. In such instances, second portion 6B of the flexible body may include hollow section 20. Hollow section 20 of second portion 6B of the flexible body slidably receives a section of first portion 6A of the flexible body, thereby connecting first portion 6A and second portion 6B in an adjustable manner such that temporary maintenance sign 2 may be used with toilets of any size.

In such instances, flexible body 6 may include a locking mechanism to secure first portion 6A and second portion 6B. For instance, hollow section 20 of second portion 6B of the flexible body may include one or more holes 16A-16C (collectively, "holes 16"). The section of first portion 6A of the flexible body may include a push button spring clip 18. As such, when the section of first portion 6A of the flexible body is inserted into hollow section of second portion 6B of the flexible body, push button spring clip 18 protrudes through one or more of holes 16, such as hole 16C in FIG. 1, of hollow section 20 to lock the section of first portion 6A of the flexible body into place.

In other instances, hollow section 20 may be a third physically separate portion of flexible body 6. In other words, flexible body 6 may include first portion 6A that includes the first end, second portion 6B that includes the second end, and a separate hollow section 20, or a hollow connector, structurally similar to hollow section, except for hollow section/connector 20 not being physically attached to second portion 6B. In such instances, hollow section/connector 20 of flexible body 6 slidably receives both a section of first portion 6A of the flexible body and a section of second portion 6B of the flexible body.

The separate hollow section/connector 20 may also include holes 16, with the section of first portion 6A of the flexible body including push button spring clip 18. When the section of first portion 6A of the flexible body is inserted into hollow section/connector 20 of flexible body 6, push button spring clip 18 may protrude through one or more of holes 16, such as hole 16C, of hollow section/connector 20 to lock the section of first portion 6A of the flexible body into place. While not pictured, second portion 6B of the flexible body may also include a push button spring clip 18 to lock second portion 6B to hollow section/connector 20 in a same manner as first portion 6A.

FIG. 2 is a conceptual diagram illustrating a front view of an example of temporary maintenance sign 2 holding out-of-order sign 8 and installed on a urinal-type toilet 10, in accordance with this disclosure.

In the example of FIG. 2, temporary maintenance sign 2 further includes out-of-order sign 8, which may attach to flexible body 6. For instance, out-of-order sign 8 may attach to flexible body 6 by receiving flexible body 6 through one or more loops 14A and 14B (collectively, "loops 14") in out-of-order sign 8, such as through loops 14 being placed at a top, middle, or bottom portion of out of order sign 8. In some instances, such as the example of FIGS. 3 and 4, loops 14 may be part of the structure of the sign and located on a top side or a back side of out-of-order sign 8. In other instances, such as the example of FIG. 2, loops 14 each may be a mechanical clip inserted through a hole in the out-of-order sign.

In other instances, out-of-order sign 8 may attach to flexible body 6 using one or more self-adhering attachment points, such as hook and loop straps, clamps, rope ties, mechanical clips, or any other type of strap or attachment mechanism to secure out-of-order sign 8 around flexible body 6. In still other instances, flexible body 6 may include one or more hooks, and out-of-order sign 8 may include one or more eyelets. In such instances, out-of-order sign 8 may attach to one or more of the one or more hooks included on flexible body 6 through the one or more eyelets in out-of-order sign 8, such as by hanging out-of-order sign 8 on the hook and through the eyelet.

In FIG. 2, toilet 10 may be a urinal-type toilet. In this example, first adherence mechanism 4A adheres to a first surface of toilet 10, such as an outside wall of toilet 10. Second adherence mechanism 4B adheres to a second surface of toilet 10 opposite the first surface of toilet 10, such as an outside wall of toilet 10 on the opposite side of toilet 10 as the first surface.

As shown in FIG. 2, when first adherence mechanism 4A is adhered to the first surface of toilet 10 and when second adherence mechanism 4B is adhered to the second surface of toilet 10, flexible body 6 spans across an opening in toilet 10. Flexible body 6 may be long enough to universally fit any number of toilet sizes and designs. By being at least somewhat flexible, flexible body 6 may bend when first adherence mechanism 4A and second adherence mechanism 4B are adhered onto a narrower opening, protruding outward from or into the opening of the toilet with that bend. When adhered onto a wider opening, the flexibility of flexible body 6 may allow flexible body to extend to fit the wider opening of the toilet, protruding less, or not at all, in this instance.

As temporary maintenance sign 2 may be reusable, the user may also uninstall temporary maintenance sign 2. For instance, the user may detach first adherence mechanism 4A from the first surface of toilet 10 and detach second adherence mechanism 4B from the second surface of toilet 10, thereby removing temporary maintenance sign 2 from toilet 10 so that it may be reused elsewhere.

FIG. 3 is a conceptual diagram illustrating a side view of an example of temporary maintenance sign 2 holding out-of-order sign 8 and installed on a bowl-type toilet 12, in accordance with this disclosure.

In the example of FIG. 3, temporary maintenance sign 2 further includes out-of-order sign 8, which may attach to flexible body 6. For instance, out-of-order sign 8 may attach to flexible body 6 by receiving flexible body 6 through one or more loops in out-of-order sign 8, such as through loops places at a top, middle, or bottom portion of out of order sign 8. In other instances, out-of-order sign 8 may attach to flexible body 6 using one or more self-adhering attachment points, such as hook and loop straps, clamps, rope ties, or any other type of strap or attachment mechanism to secure out-of-order sign 8 around flexible body 6. In still other instances, flexible body 6 may include one or more hooks, and out-of-order sign 8 may include one or more eyelets. In such instances, out-of-order sign 8 may attach to one or more of the one or more hooks included on flexible body 6 through the one or more eyelets in out-of-order sign 8, such as by hanging out-of-order sign 8 on the hook and through the eyelet. IN still other instances, out-of-order sign 8 may attach to flexible body 6 by receiving flexible body 6 through loops, such as loops 14 of FIGS. 2 and 4, such as through loops 14 being placed at a top, middle, or bottom portion of out of order sign 8. In some instances, such as the example of FIGS. 2 and 4, loops 14 may be part of the structure of the sign and located on a top side or a back side of out-of-order sign 8. In other instances, such as the example of FIG. 2, loops 14 each may be a mechanical clip inserted through a hole in the out-of-order sign.

In FIG. 3, toilet 12 may be a bowl-type toilet. In this example, first adherence mechanism 4A (not pictured) adheres to a first surface of toilet 12, such as an outside portion of the bowl of toilet 12. Second adherence mechanism 4B adheres to a second surface of toilet 12 opposite the first surface of toilet 12, such as an outside portion of the bowl of toilet 12 on the opposite side of toilet 12 as the first surface.

As shown in FIG. 3, when first adherence mechanism 4A is adhered to the first surface of toilet 12 and when second adherence mechanism 4B is adhered to the second surface of toilet 12, flexible body 6 spans across an opening in toilet 12. Flexible body 6 may be long enough to universally fit any number of toilet sizes and designs. By being at least somewhat flexible, flexible body 6 may bend when first adherence mechanism 4A and second adherence mechanism 4B are adhered onto a narrower opening, protruding outward from or into the opening of the toilet with that bend. When adhered onto a wider opening, the flexibility of flexible body 6 may allow flexible body to extend to fit the wider opening of the toilet, protruding less, or not at all, in this instance.

As temporary maintenance sign 2 may be reusable, the user may also uninstall temporary maintenance sign 2. For instance, the user may detach first adherence mechanism 4A from the first surface of toilet 10 and detach second adherence mechanism 4B from the second surface of toilet 10, thereby removing temporary maintenance sign 2 from toilet 10 so that it may be reused elsewhere.

Temporary maintenance sign 2 produces a number of benefits over the disposable and cumbersome temporary signs previously available. By using the adherence mechanisms 4A and 4B described herein, temporary maintenance sign 2 is easy to install on the smooth, hard surfaces provided by the glazed ceramic, metal, plastic, vitreous china, or porcelain toilets. The temporary maintenance sign is also reusable, reducing costs and reducing waste. Additionally, by protruding over an opening of the toilet, the temporary maintenance sign provides an adequate physical barrier to dissuade patrons from utilizing the toilets to which the temporary maintenance signs are attached.

Figure 4:
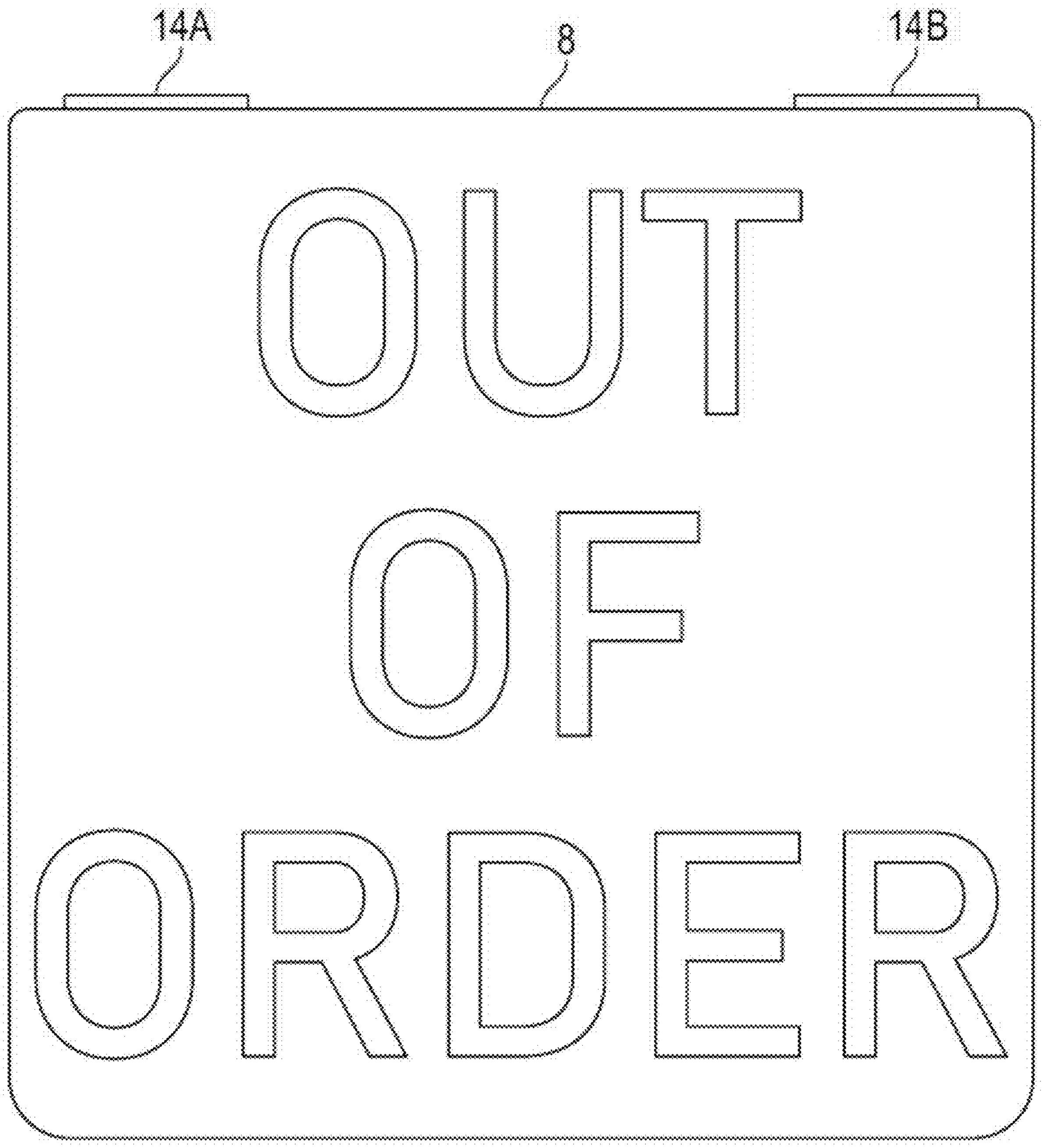
FIG. 4 is a conceptual diagram illustrating an example out-of-order sign to be installed on a temporary maintenance sign, in accordance with this disclosure.

FIG. 4 is a conceptual diagram illustrating an example out-of-order sign 8 to be installed on a temporary maintenance sign, such as temporary maintenance sign 2, in accordance with this disclosure. Out-of-order sign 8 may be configured to attach to a flexible body of a temporary maintenance sign, such as flexible body 6 of FIG. 1.

For instance, in the example of FIG. 4, out-of-order sign 8 may attach to flexible body 6 by receiving flexible body 6 through one or more loops 14A and 14B in out-of-order sign 8, such as through loops places at a top, middle, or bottom portion of out of order sign 8. In the example of FIG. 4, loops 14A and 14B are located at a top portion of out-of-order sign 8. In other instances, out-of-order sign 8 may attach to flexible body 6 using one or more self-adhering attachment points, such as hook and loop straps, clamps, rope ties, or any other type of strap or attachment mechanism to secure out-of-order sign 8 around flexible body 6.

In still other instances, flexible body 6 may include one or more hooks, and out-of-order sign 8 may include one or more eyelets. In such instances, out-of-order sign 8 may attach to one or more of the one or more hooks included on flexible body 6 through the one or more eyelets in out-of-order sign 8, such as by hanging out-of-order sign 8 on the hook and through the eyelet.

Figure 5:
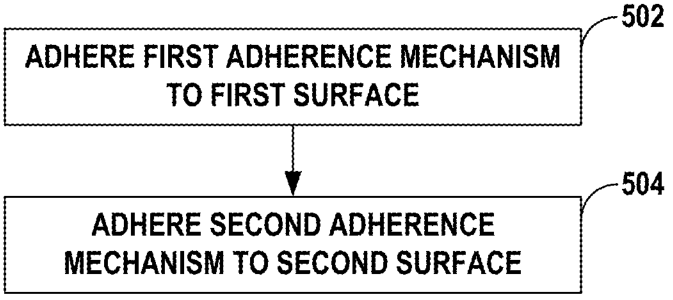
FIG. 5 is a flow chart illustrating an example method for installing the temporary maintenance sign, in accordance with this disclosure.

FIG. 5 is a flow chart illustrating an example method for installing the temporary maintenance sign, in accordance with this disclosure. The techniques of FIG. 5 may be performed using a temporary maintenance sign, such as temporary maintenance sign 2 of FIGS. 1-3. For purposes of illustration only, the techniques of FIG. 5 are described within the context of temporary maintenance sign 2 of FIG. 2, although temporary maintenance signs having configurations different than that of temporary maintenance sign 2 may also be used to perform the techniques of FIG. 5.

In accordance with the techniques described herein, a user may adhere first adherence mechanism 4A to a first surface of toilet 10 (502). The user may also adhere second adherence mechanism 4B to a second surface of toilet 10 (504). When first adherence mechanism 4A is adhered to the first surface of toilet 10 and when second adherence mechanism 4B is adhered to the second surface of toilet 10, flexible body 6 spans across an opening in toilet 10.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently rather than sequentially.

Various examples of the disclosure have been described. Any combination of the described systems, operations, or functions is contemplated. These and other examples are within the scope of the following claims.

What is claimed is:

1. A temporary maintenance sign for a toilet, the temporary maintenance sign comprising:

a first adherence mechanism;

a second adherence mechanism; and a flexible body that connects to the first adherence mechanism on a first end of the flexible body and connects to the second adherence mechanism on a second end of the flexible body, wherein the flexible body comprises a first portion that includes the first end and a second portion that includes the second end, wherein the first portion of the flexible body is physically separate from the second portion of the flexible body, wherein the second portion of the flexible body slidably receives a section of the first portion of the flexible body.

2. The temporary maintenance sign of claim 1, further comprising:

an out-of-order sign configured to attach to the flexible body.

3. The temporary maintenance sign of claim 2, wherein the out-of-order sign attaches to the flexible body by receiving the flexible body through one or more loops in the out-of-order sign.

4. The temporary maintenance sign of claim 3, wherein the one or more loops each comprise a mechanical clip inserted through a hole in the out-of-order sign.

5. The temporary maintenance sign of claim 2, wherein the out-of-order sign attaches to the flexible body using one or more self-adhering attachment points.

6. The temporary maintenance sign of claim 1, wherein the first adherence mechanism comprises one or more of:

a suction cup; and a locking suction cup with a pressure lever.

7. The temporary maintenance sign of claim 1, wherein the flexible body comprises one or more of:

a semi-rigid metal, a semi-rigid plastic, a semi-rigid fiberglass, a semi-rigid rubber, a flexible metal, a flexible plastic, a flexible fiberglass, and a flexible rubber.

8. The temporary maintenance sign of claim 1, wherein the first adherence mechanism adheres to a first surface of the toilet, wherein the second adherence mechanism adheres to a second surface of the toilet opposite the first surface of the toilet, and wherein, when the first adherence mechanism is adhered to the first surface of the toilet and when the second adherence mechanism is adhered to the second surface of the toilet, the flexible body spans across an opening in the toilet.

9. The temporary maintenance sign of claim 8, wherein the toilet comprises one or more of:

a bowl toilet, and a urinal.

10. The temporary maintenance sign of claim 1, wherein the second portion of the flexible body comprises a hollow section, and wherein the hollow section of the second portion of the flexible body slidably receives a section of the first portion of the flexible body.

11. The temporary maintenance sign of claim 10 wherein the hollow section of the second portion of the flexible body includes one or more holes, wherein the section of the first portion of the flexible body includes a push button spring clip, and wherein, when the section of the first portion of the flexible body is inserted into the hollow section of the second portion of the flexible body, the push button spring clip protrudes through one or more of the one or more holes of the hollow section to lock the section of the first portion of the flexible body into place.

12. The temporary maintenance sign of claim 1, wherein the second portion includes the second end and a hollow connector, wherein and the hollow connector are physically separate, and wherein the hollow connector of the flexible body slidably receives a section of the first portion of the flexible body and a section of the second end of the flexible body.

13. The temporary maintenance sign of claim 12, wherein the hollow connector of the flexible body includes one or more holes, wherein the section of the first portion of the flexible body includes a push button spring clip, and wherein, when the section of the first portion of the flexible body is inserted into the hollow connector of the flexible body, the push button spring clip protrudes through one or more of the one or more holes of the hollow connector to lock the section of the first portion of the flexible body into place.

14. The temporary maintenance sign of claim 1, wherein the first adherence mechanism comprises a material that is one or more of:

flat; and textured.

15. The temporary maintenance sign of claim 14, wherein the material comprises one or more of:

rubber;

fiberglass;

silicone; and plastic.

16. A method for installing a temporary maintenance sign, the method comprising:

adhering a first adherence mechanism of the temporary maintenance sign to a first surface of a toilet; and adhering a second adherence mechanism temporary maintenance sign to a second surface of the toilet, wherein, when the first adherence mechanism is adhered to the first surface of the toilet and when the second adherence mechanism is adhered to the second surface of the toilet, a flexible body temporary maintenance sign spans across an opening in the toilet.

17. The method of claim 16, further comprising:

detaching the first adherence mechanism from the first surface of the toilet; and detaching the second adherence mechanism from the second surface of the toilet.

18. A temporary maintenance sign for a toilet, the temporary maintenance sign comprising:

a first adherence mechanism;

a second adherence mechanism; and a flexible body that connects to the first adherence mechanism on a first end of the flexible body and connects to the second adherence mechanism on a second end of the flexible body, wherein the flexible body comprises a first portion that includes the first end, a second portion that includes the second end, and a hollow connector, wherein the first portion of the flexible body, the second portion of the flexible body, and the hollow connector of the flexible body are all physically separate, and wherein the hollow connector of the flexible body slidably receives a section of the first portion of the flexible body and a section of the second portion of the flexible body.

* * * * *